(No Model.)
F. I. MAULE.
HANDLE FOR STEAM VALVES.
No. 271,887. Patented Feb. 6, 1883.
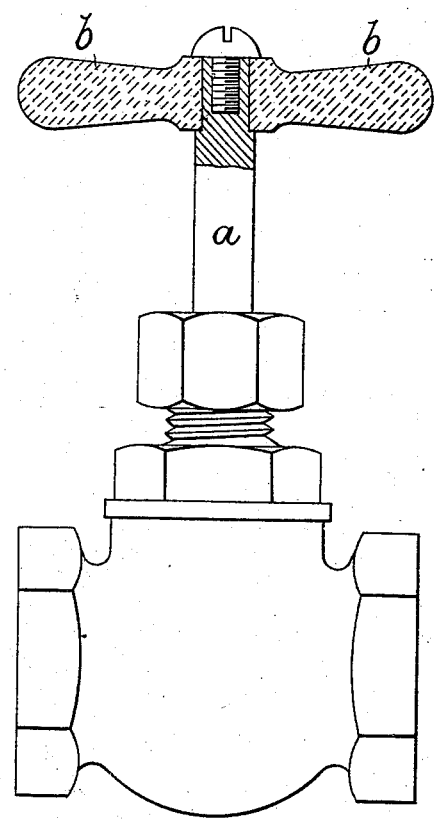
Witnesses
H L Fulenwider.
Harry Smith
Inventor
Francis I. Maule
by his Attorneys
Howson & Sons

UNITED STATES PATENT OFFICE.

FRANCIS I. MAULE, OF PHILADELPHIA, PENNSYLVANIA.

HANDLE FOR STEAM-VALVES.

SPECIFICATION forming part of Letters Patent No. 271,887, dated February 6, 1883.

Application filed August 4, 1881. (No model.)

*To all whom it may concern:*

Be it known that I, FRANCIS I. MAULE, a citizen of the United States, residing in Philadelphia, Pennsylvania, have invented an Improved Handle for Steam-Valves, of which the following is a specification.

The object of my invention is to provide a steam-valve with a handle which will not become so highly heated as to prevent its manipulation with comfort at any time, and this object I attain by making the handle of glass, as hereinafter set forth.

In the accompanying drawing I have shown an ordinary globe-valve, of which $a$ is the stem, and $b$ the handle, the latter consisting of a disk of glass pressed or otherwise molded to the proper shape, and having a central opening for the reception of the squared upper end of the stem $a$, to which it is secured by the usual set-screw. The glass handle will absorb heat slowly and will radiate or discharge it rapidly, and as the radiating-surface of the handle is large and the surface in contact with the stem $a$ small, I have found in practice that the outer portions of the handle remain cool at all times, while those portions at and near the stem do not become so highly heated as to be uncomfortable to the touch.

Ordinary wooden handles for steam-valves are liable to become warped and split by the heat to which they are subjected, and in order to remedy this defect the clamping devices for the handle must be of such large size that the advantages of the latter as regards non-conducting properties are practically neutralized, whereas a glass handle is free from liability to warp, and hence can be held in place upon the stem of the valve without requiring any extended bearing upon the latter. Thus in the valve shown in the drawing the handle rests upon a contracted shoulder on the stem, and is held in place by the head of the confining-screw, so that the surface in actual contact with the heated metal is extremely limited.

I claim as my invention—

1. The combination of the shouldered stem of a steam-valve and its confining-screw with a handle consisting of a disk of glass confined to said shouldered portion of the stem, as set forth.

2. The within-described handle for steam-valves, the same consisting of a disk of glass having a central opening for the stem of the valve, as set forth.

In testimony whereof I have signed my name to this specification in the presence of two subscribing witnesses.

FRANCIS I. MAULE.

Witnesses:
JAMES F. TOBIN,
HARRY SMITH.